United States Patent [19]

Saitoh et al.

[11] 3,933,633

[45] Jan. 20, 1976

[54] METHOD FOR SEPARATING VINYL CHLORIDE

[75] Inventors: Kozo Saitoh, Tokyo; Sumio Izumi, Kokubunji, all of Japan

[73] Assignee: Mitsui Mining & Smelting Co., Ltd., Tokyo, Japan

[22] Filed: May 14, 1974

[21] Appl. No.: 469,922

[30] Foreign Application Priority Data

Dec. 15, 1973 Japan............................ 48-140909

[52] U.S. Cl.................................... 210/44; 210/54
[51] Int. Cl.². ........................................ C02B 1/18
[58] Field of Search .................. 210/42, 44, 51, 54; 209/167

[56] References Cited
UNITED STATES PATENTS

| | | | |
|---|---|---|---|
| 2,253,566 | 8/1941 | Klepetko.............................. | 210/44 |
| 3,160,586 | 12/1964 | Duke.................................... | 210/44 |
| 3,234,195 | 2/1966 | Matsumoto et al................. | 210/44 X |

FOREIGN PATENTS OR APPLICATIONS 863,399    3/1961    United Kingdom.................. 210/44

*Primary Examiner*—Thomas G. Wyse
*Attorney, Agent, or Firm*—Sughrue, Rothwell, Mion, Zinn & Macpeak

[57] ABSTRACT

A method for separating vinyl chloride from a mixture of vinyl chloride with other non-plastic substances such as sand and soil, metals, glass or rubbers which comprises introducing gas bubbles into a dispersion of the vinyl chloride mixture in an aqueous liquid medium such as water or salt water and containing a flotation agent such as pine oil thereby to float the vinyl chloride and collect it.

6 Claims, No Drawings

METHOD FOR SEPARATING VINYL CHLORIDE

BACKGROUND OF THE INVENTION

1. Field of the Invention

This invention relates to a method for separating vinyl chloride from a mixture of vinyl chloride with other substances.

The term "vinyl chloride", as used in the present specification and appended claims, denotes a vinyl chloride monomer powder, a vinyl chloride polymer powder, and polyvinyl chloride in various shapes. Examples of other substances in the mixture from which the vinyl chloride can be separated include materials such as soil, sand, metals, glass, or rubber.

2. Description of the Prior Art

Mixtures of vinyl chloride with other substances are present, for example, in contaminated products in the manufacture of vinyl chloride monomers or polymers and in wastes of composite materials using vinyl chloride. By separating and removing the other substances, the vinyl chloride becomes purer, and has a higher value as a product. Moreover, the wastes can be reused and therefore the other substances separated can also be utilized.

The only conventional method for separating vinyl chloride from a mixture of vinyl chloride with other substances has relied on a separation in water utilizing the difference in the specific gravity between the vinyl chloride and the other substances. In performing this specific gravity separation, the material (mixture) to be treated should be of substantially the same size, but actually, the mixture contains sizes unsuitable for separation which reduces the efficiency of separation. Furthermore, substances having similar specific gravities cannot be separated from each other with good results, and this method based on the difference in specific gravity is unsuitable for treating large quantities of material continuously.

It is an object of this invention to provide a new method for separating vinyl chloride from a mixture of vinyl chloride with other substances.

SUMMARY OF THE INVENTION

We have found that the surface of vinyl chloride is hydrophobic and is difficult to wet with water, and that vinyl chloride can be made to float by adhering gas bubbles thereto.

Accordingly, this invention provides a method for separating vinyl chloride, which comprises placing a mixture of vinyl chloride and other substances in an aqueous liquid medium and introducing gas bubbles into the medium in the presence of a flotation agent thereby to float the vinyl chloride.

DETAILED DESCRIPTION OF THE INVENTION

The method of this invention can be applied directly to a material in the form of granules, fine particles or films. But if the particle size of granules or fine particles is large, the particle size must be comminuted to a size less than about 10 mm. Suitable sizes for the films are, e.g., pieces whose sum of the longest length or diagonal and the shortest width divided by two is less than about 100 mm.

The material is placed in an aqueous liquid medium such as water or salt water, and a flotation agent, such as pine oil, kerosene, cresylic acid, eucalyptus oil, camphor oil, pyridine, o-toluidine, higher alcohols having four to five carbon atoms such as propyl alcohol, amyl alcohol, etc., methyl isobutyl carbinol or a mixture thereof, is added in an amount of up to about 1,000 g, preferably 10 to 200 g, per ton of the material. When gas bubbles are introduced into the aqueous liquid medium, the vinyl chloride is floated due to the adherence of the gas bubbles.

In order to depress the floating of the other substances than the vinyl chloride, depressants such as sodium silicate, starch, dextrin, or hydrofluoric acid, etc. are added where the other substances are soil, sand or glass, or surface modifiers such as sodium cyanide, potassium ferrocyanide, potassium ferricyanide, or bichromate, etc. are added where the other substances are metals. Better separation results are obtained using these depressants and surface modifiers. Generally, a suitable amount can range from about 50 to 100 g/ton.

The present invention is carried out in an aqueous liquid medium which includes water and salt water. Suitable examples of salt water include sea water, brine, bittern-containing water as well as aqueous solutions containing halides such as NaCl, $MgCl_2$ and $MgBr_2$, etc., sulfates such as $MgSO_4$, $CaSO_4$, $K_2SO_4$ and $Na_2SO_4$, etc. and bicarbontes such as $Ca(HCO_3)_2$ and $NaHCO_3$, etc. Water generally is employed as the aqueous liquid medium.

Gas bubbles may be generated in the aqueous liquid medium separation tank using any known method, such as mechanically stirring, bubbling a gas through the aqueous liquid medium, release of dissolved gas under pressure, evacuation to release dissolved gases, electolysis or a combination of two or more of these methods. Suitable gases which can be used are oxygen, air, nitrogen, carbon dioxide, inert gases such as argon, etc. and finer bubble sizes are preferred. A variety of tank shapes can be employed, for example, the tanks can be tetragonal, regular and non-regular polygonal or circular, and also can be a trough-type, thickener-type or cyclone-type tank.

A suitable proportion of the material (mixture) in the separation tank is about 1 to 30, preferably 1 to 10, parts by weight per 100 parts by weight of the aqueous liquid medium. The temperature of the aqueous liquid medium is not critical in the method of this invention, but is preferably in the range of from about 0° to about 70°C, most preferably at an environment temperature (about 15° to about 35°C). Temperatures below about 0°C are practically not preferred since at such low temperatures the efficiency of separation of the mixture in the flotation tends to decrease. On the other hand, the use of a temperature higher than about 70°C makes the method of the present invention uneconomical and, in addition, such a higher temperature is not desirable from the standpoint of the working environment. The aqueous liquid medium is usually used at room temperature (about 20° – 30°C), but the separation of vinyl chloride from the other substances is promoted if the medium is warmed. Furthermore, the method of this invention is applicable over a wide pH range. The medium may also contain inorganic or organic substances such as those generally found in river water, industrial water, etc. without impairing the method of this invention.

As stated above, this invention comprises a method of floating vinyl chloride by adhering gas bubbles to it in the presence of a flotation agent utilizing the hydrophobic properties of the vinyl chloride, and is quite different from the conventional float-sink method based on the utilization of differences in specific gravity. According to this invention, there is no need to arrange the sizes of the treating materials, and materials having similar specific gravities can also be separated with high precision. The method of this invention is very valuable as a continuous treating method involving large quantities of material, and the materials separated can be reclaimed and reused.

The following Examples are given to illustrate the present invention in greater detail. Unless otherwise indicated all parts, percents, ratios and the like are by weight.

EXAMPLE 1

In the process of producing vinyl chloride, soil and sand having a size of less than 5 mm may sometimes be mixed in a vinyl chloride powder. It has been the previous prior art practice to remove the soil and sand by overflowing the vinyl chloride which has a low specific gravity using a rising water stream. However, good separation cannot be ensured since the soil and sand in fine sizes overflow with the vinyl chloride.

400 grams of such a material was placed in a rectangular separation tank containing 8,000 ml of water, and pine oil was added in an amount of 30 grams per ton of the material. Gas bubbles were introduced for 5 minutes to float the vinyl chloride and collect it. Since the floating material contained small amounts of soil and sand, it was precisely separated for 5 minutes using 10 grams of pine oil. Vinyl chloride which was substantially pure and free from the soil and sand could be separated at a recovery of 98%.

EXAMPLE 2

The vinyl chloride coatings peeled from used copper wires were pulverized to a size of less than about 5 mm. The resulting vinyl chloride waste contains 3 to 5% by weight of copper wire waste. In the prior art separation method, the vinyl chloride was separated from the copper by the float-sink method based on utilization of difference in specific gravity. According to this prior method, copper fragments of large sizes can be separated, but fine copper powder is still mixed with the vinyl chloride and cannot be removed. If the vinyl chloride contains copper, a remarkable decline in quality and copper loss results when reusing. Accordingly, it is necessary to remove the copper powder.

300 grams of such a material was placed in a rectangular separation tank containing 8,000 ml of water, and sodium cyanide was added in an amount of 50 grams per ton of the material. Then, 40 grams of pine oil was added, and gas bubbles were introduced for 6 minutes to float the vinyl chloride. Since this floating material contained a very small amount of a copper powder, it was precisely separated for 5 minutes using 10 grams of sodium cyanide per ton of the starting material. Vinyl chloride substantially free from the copper could be separated at a recovery of 97.5%.

EXAMPLE 3

Coatings stripped from used copper wires were pulverized to a size of less than about 5 mm to form coating wastes. These wastes contained vinyl chloride and rubber, and with prior techniques they could not be separated from each other, and had to be discarded.

240 grams of such a material was placed in a rectangular separation tank containing 8,000 ml of water, and pine oil was added in an amount of 50 grams per ton of the material. Gas bubbles were introduced for 3 minutes. Vinyl chloride substantially free from rubber could be floated and recovered at a recovery of 98%.

The materials separated in these Examples could be reclaimed and reused.

While the invention has been described in detail and with reference to specific embodiments thereof, it will be apparent to one skilled in the art that various changes and modifications can be made therein without departing from the spirit and scope thereof.

What is claimed is:

1. A method for separating vinyl chloride from a mixture of vinyl chloride with other non-plastic substances selected from the group consisting of soil, sand, metals, glass, rubber and a mixture thereof, which comprises introducing gas bubbles into a dispersion of the vinyl chloride mixture in an aqueous liquid medium, and adding to said dispersion a flotation agent selected from the group consisting of pine oil, kerosene, cresylic acid, eucalyptus oil, camphor oil, a higher alcohol, methyl isobutyl carbinol, pyridine, o-toluidine and a mixture thereof thereby to float the vinyl chloride due to the adherence of the gas bubbles thereto.

2. The method of claim 1, wherein the amount of said flotation agent is up to about 1,000 grams per ton of said mixture.

3. The method of claim 1, wherein the proportion of said vinyl chloride mixture is about 1 to 30 parts by weight per 100 parts by weight of said aqueous liquid medium.

4. The method of claim 1, wherein said aqueous liquid medium is water or salt water.

5. The method of claim 1, wherein said aqueous liquid medium is warmed.

6. The method of claim 1, wherein said flotation agent is pine oil.

* * * * *